Patented Jan. 4, 1949

2,457,798

UNITED STATES PATENT OFFICE 2,457,798

PRODUCTION OF TIN FLUOBORATE

Alfred L. Ferguson, Ann Arbor, Mich., assignor to Federal-Mogul Corporation, Detroit, Mich., a corporation of Michigan No Drawing. Application March 18, 1944, Serial No. 527,149

2 Claims. (Cl. 23—59)

This invention relates to a method of producing and making commercially available tin fluoborate, and to the material as a novel compound, thus produced. It has for its object the avoidance of the previously encountered difficulties in the production of such a material arising from reliance upon a previously made fluoborate bath.

My improvement has been reliable for the production of a tin fluoborate solution in the desired stannous condition which is indeed essential when it is intended to mix it with a lead fluoborate solution for the production of an electroplating bath to be used for the electrodeposition of lead-tin alloys. My newly developed tin fluoborate is not, however, to be considered as in any way restricted to such use.

In the production of tin fluoborate according to my invention, there are mixed, in suitable proportions, fluoboric acid, a material soluble therein, and metallic tin, the metallic constituent of which soluble material is precipitatable therefrom by the action upon it of the metallic tin, cupric oxide being suggested as an example of one of several possibly usable soluble materials. The action upon it of the introduced metallic tin, in either granular or pulverized form, is to effect the precipitation or chemical removal from the solution of the copper constituent, and at the same time the metallic tin content is changed to tin fluoborate. The removal of the copper content or its equivalent from the solution by the action of the tin content upon it is so thorough that the taken-out copper content may be easily recovered for re-use in the preparation of a further lot of tin fluoborate.

It is recommended that, after the copper oxide has been added to the fluoboric acid, the mixture be heated to about 180 degrees F. and slowly stirred until the reaction is complete. The solution is then lowered to room temperature, after which the required amount of tin is added. The effectiveness of the reaction with tin can be improved by gentle agitation of the mixture.

I have found that the desired tin fluoborate can be prepared satisfactorily by adding 150 grams of black cupric oxide to one liter of 40% fluoboric acid at about 180 degrees F. This solution is then cooled to room temperature and to it is added approximately 250 grams of tin in the form of granules or powder. It is well to add the tin in about 10 gram samples. The copper which is displaced from the solution by the introduced tin is removed by filtration and may be reconverted to cupric oxide for re-use in the preparations of another batch.

What I claim is:

1. The method of producing tin fluoborate, which comprises mixing fluoboric acid and cupric oxide, heating the resulting mixture to dissolve the cupric oxide and form a solution of copper fluoborate, adding to the said solution metallic tin to react with the solution and produce tin fluoborate and precipitating metallic copper from the solution.

2. The method of producing tin fluoborate, which comprises mixing fluoboric acid and cupric oxide to effect the dissolution of the cupric oxide in favor of the formation of a copper fluoborate solution, adding metallic tin to such solution to react therewith to produce tin fluoborate, and precipitating metallic copper from the solution.

ALFRED L. FERGUSON.

REFERENCES CITED

The following references are of record in the file of this patent:

Mellor: "Comprehensive Treatise on Inorganic and Theoretical Chemistry," vol. V, 1924, pages 126–128.

Handbook of Chemistry and Physics, 22nd edition (1937–1938), pub. by Chemical Rubber Publishing Co., Cleveland, Ohio, page 981.

"Transactions of the Electrochemical Society," vol. 80, 1941, page 654.